Figure 6:
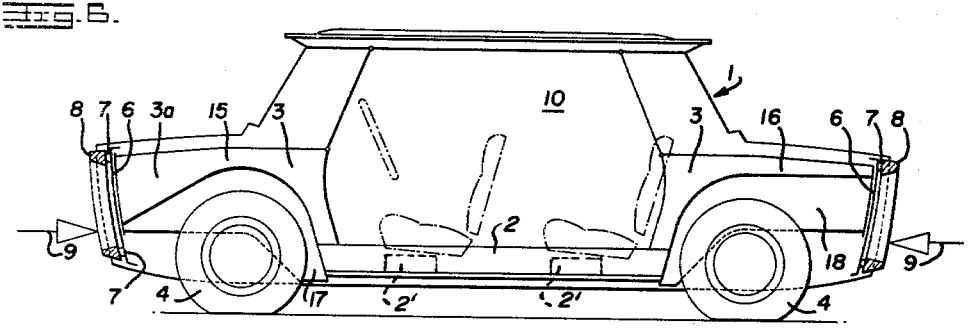

March 2, 1965     B. BARENYI     3,171,669
MOTOR VEHICLE SAFETY FRAME
Filed March 11, 1959     3 Sheets-Sheet 1
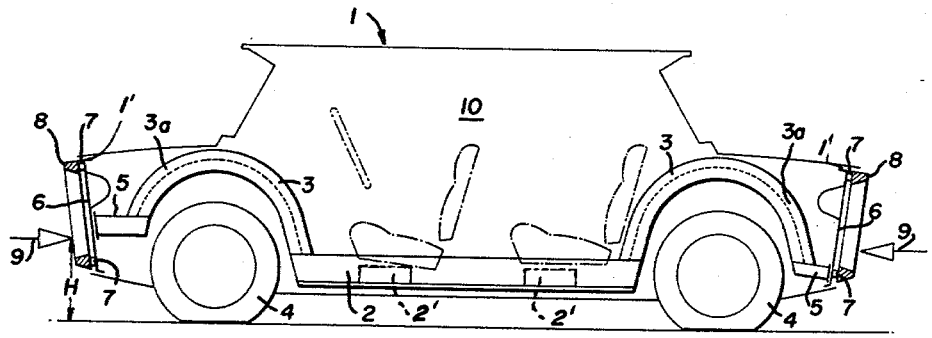
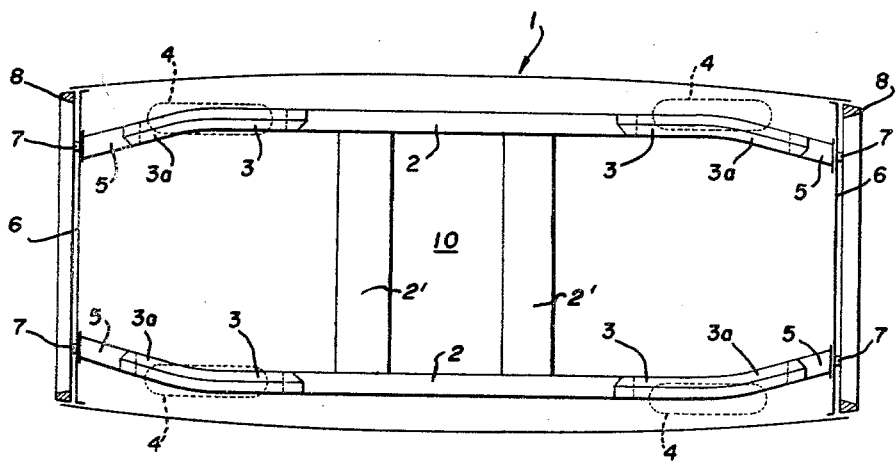
INVENTOR.
BELA BARENYI
BY Dicke, Craig and Freudenberg
ATTORNEYS March 2, 1965     B. BARENYI     3,171,669
MOTOR VEHICLE SAFETY FRAME
Filed March 11, 1959     3 Sheets-Sheet 2
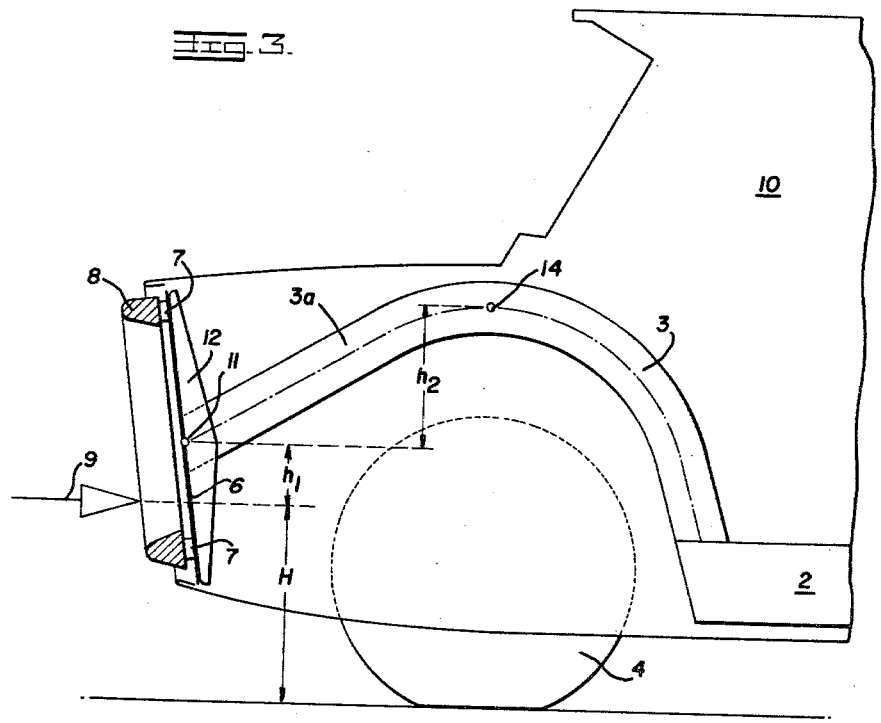
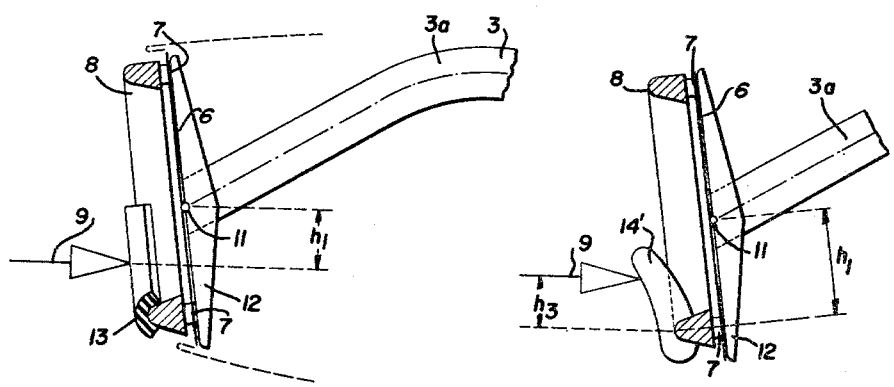
INVENTOR.
BELA BARENYI
BY Dicke, Craig and Freudenberg
ATTORNEYS March 2, 1965  B. BARENYI  3,171,669
MOTOR VEHICLE SAFETY FRAME Filed March 11, 1959  3 Sheets-Sheet 3

INVENTOR.
BELA BARENYI
BY Dicke, Craig and Freudenberg
ATTORNEYS

United States Patent Office 3,171,669
Patented Mar. 2, 1965

3,171,669
MOTOR VEHICLE SAFETY FRAME
Bela Barenyi, Stuttgart-Vaihingen, Germany, assignor to Daimler-Benz Aktiengesellschaft, Stuttgart-Unterturkheim, Germany
Filed Mar. 11, 1959, Ser. No. 798,684
Claims priority, application Germany, Mar. 11, 1958, D 27,598
11 Claims. (Cl. 280—106)

The present invention relates to the particular construction of a frame of a motor vehicle, especially within the front and rear region thereof.

The purpose of improving the protection for the vehicle itself as well as for the passengers thereof in case of collision by the particular construction of the motor vehicle is basic to the present invention.

Furthermore, according to the present invention, the frame within the area of the wheel base is to be protected by the particular construction and arrangement of the frame or chassis within the front and rear region of the vehicle against deformations which even in case of the smaller collisions that occur most frequently would normally result in disabling the vehicle, i.e., render the same unavailable for some usually rather considerable period of time until the repairs thereof are completed.

The construction of the frame within the front and rear region of a motor vehicle in accordance with the present invention is particularly suited for passenger motor vehicles which, following the modern constructions and configurations used in connection therewith, are provided at the front and/or rear end thereof, in the place of the usual bumper, with a frame-like or plate-like impact-protective member projecting forwardly or rearwardly respectively.

With most known types of motor vehicles, the longitudinal bearer members are extended over the wheel axle directly up to the rear of the bumper, and the bumper itself is secured at the longitudinal bearer members at the height of the latter. The present invention deviates basically from this prior art construction by inserting between the longitudinal bearer members of the vehicle and the impact-protective device, for instance, a bumper, intermediate connecting members which are constructed and arranged in a special manner.

The present invention is characterized by the fact that structural and connecting parts are provided in the direction of the drive in front or to the rear of the frame portions arranged between the two transversely extending planes passing through the wheel axes, which structural and connecting parts exhibit a rigidity or resistance against impacts decreasing in the direction toward the respective vehicle end by reason of the particular dimensioning thereof and/or the particular arrangement thereof, and/or the selection of the particular materials thereof.

By reason of the fact that the structural and connecting parts in accordance with the present invention exhibit a resistance against impact decreasing in the direction from the wheel axes thereof toward the rear or front respectively, the forces, shocks and impacts which impinge or occur at the vehicle front or rear end may be absorbed, insofar as they do not exceed a rather considerable amount, by the aforementioned structural and connecting parts which though they may be deformed elastically or plastically, reduce or lessen the impact effect and do not transmit the same to the frame or central main frame structure. As a result thereof, a deformation of the vehicle in case of collision occurs only in the front or rear region of the vehicle without, however, detrimentally affecting thereby the passenger space. Furthermore, in addition to the increased safety for the passengers, a reduction in the vehicle damage, in case of collision, results therefrom.

Within the spirit of the basic concept of the present invention, the rim member, which is preferably of bulge-like shape, of the impact-protecting device is constructed with the types of passenger motor vehicles described hereinabove in such a manner as to be plastically or elastically more deformable than the structural parts carrying the rim member. In connection therewith, the impact-protective device may also consist, for example, of a terminal plate member provided with a bulge-like rim portion or only of an annular member. All other structural and connecting parts, which successively follow or adjoin the impact-protective member in the direction from in front or from the rear toward the vehicle center respectively, are constructed in logical consequence of the inventive concept herein so as to possess an ever-increasing impact resistance or rigidity in order that an ever-increasing resistance is opposed to a continuing impact force acting in the direction toward the vehicle center.

The structural and connecting parts mentioned hereinabove may consist, depending on the type of vehicle, the size thereof and the expected force acting thereon, of members or elements adapted to break, be compressed or be bent under the influence of a force which, by reason of differing materials thereof, of the particular configuration including, for instance, a tapering or pre-existing abrupt bent form, or by reason of the cross sectional profile thereof, are deformed plastically or elastically or may even break. The individual parts or members may also be arranged behind one another, i.e., in series, in such a manner that one or several lever effects are obtained whereby, pursuant to the purpose and scope of the present invention, the lever arms are to decrease in the direction toward the vehicle center. It is obvious that numerous combinations of the different enumerated possibilities for the various structural and connecting parts which are advantageous for different types of vehicles may be created in accordance with the basic concept and teachings of the present invention, though understandably only a relatively small number thereof can be described herein in detail.

For example, according to a first embodiment in accordance with the present invention, structural parts may be provided which are arranged above the wheel axles surrounding the wheels in an arcuate manner and which adjoin either directly or indirectly the grill of the radiator, which in turn, carries a bulge-shaped bordering or rim member by the interposition of elastic members adapted to be subjected to compression and possibly also to shearing stresses. The bulge-shaped rim member of the radiator grill is thereby advantageously disposed outside the height of the bumper as determined by international agreement. However, the bulge-shaped rim member may also be secured at the arcuate parts of the frame, for example, by means of breakable bolt members which are adapted to break under the lever effect that may occur as the result of a collision. Moreover, the bulge-shaped rim member, in turn, may carry horn-like members and/or a further bulge-like member which may be deformable, for example, elastically or plastically.

According to another feature in accordance with the present invention, the arcuately-shaped parts of the frame may be constructed as sheet-metal members which either have a width decreasing toward the vehicle end or which are provided approximately above the wheel axles thereof with reduced sections so dimensioned that they will undergo at those places a desired and intended deformation upon exceeding thereat a predetermined impact load. In that manner, more valuable parts which are disposed further outward of the vehicle may be protected against larger damages, on the one hand, and an impact load may be kept away from the main frame of the vehicle, on the other. As long as the force of the impact does not exceed a predetermined amount, only the arcuately-shaped structural part constructed as narrowed sheet-metal part and additionally angularly-shaped has to be replaced or possibly be bent back to the original shape thereof in case of repair.

Accordingly, it is an object of the present invention to provide a vehicle frame construction which effectively obviates the disadvantages of the prior art constructions and which protects the vehicle main frame in a far reaching manner, particularly against impact forces.

It is another object of the present invention to provide a vehicle frame construction, particularly for passenger motor vehicles which not only protects the central frame portion against possible deformation, but which also greatly contributes to improving the safety of the passengers in case of collision.

A still further object of the present invention resides in the provision of a frame construction for motor vehicles which considerably reduces the cost of repair in case of damage due to collision and which lessens extensively the time required in case of repairs.

Figure 7:
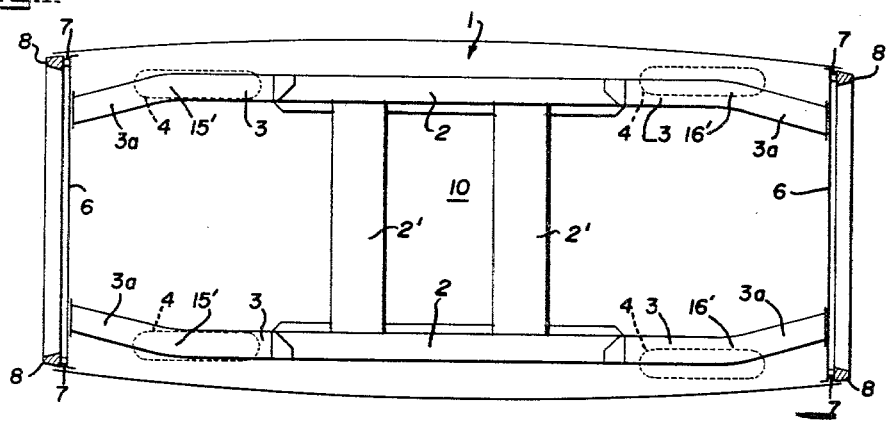
Figure 8:
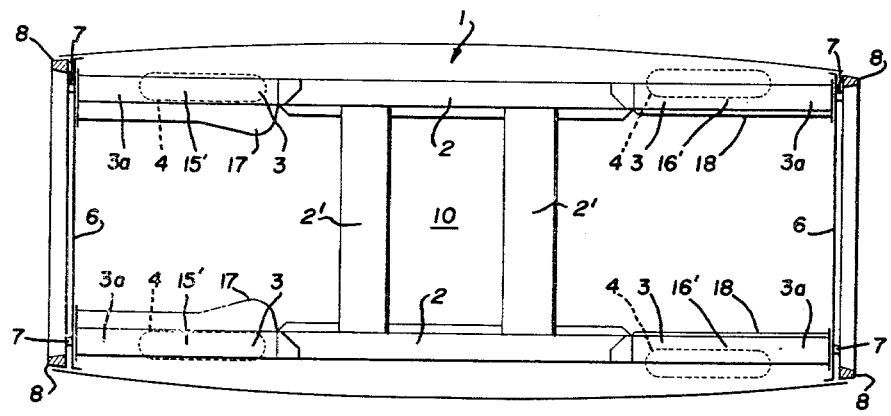

These and other objects, features and advantages of the present invention will become more obvious from the following description when taken in connection with the accompanying drawing which shows, for purposes of illustration only, several embodiments in accordance with the present invention, and wherein:

FIGURE 1 is a schematic side view of a passenger motor vehicle provided in the front and rear region of the vehicle with two frame constructions according to the present invention, FIGURE 2 is a schematic plan view of the passenger motor vehicle frame construction of FIGURE 1, FIGURE 3 is a partial schematic side view, on an enlarged scale, of a modified embodiment of a frame construction for a passenger motor vehicle according to the present invention, FIGURES 4 and 5 are partial schematic side views, similar to FIGURE 3, of two further modified embodiments of a frame construction according to the present invention, FIGURE 6 is a schematic side view of a passenger motor vehicle provided with still another modified embodiment of a frame construction according to the present invention, FIGURE 7 is a schematic plan view of a slightly modified construction of the passenger motor vehicle frame construction according to FIGURE 6, and FIGURE 8 is a schematic plan view of the passenger motor vehicle shown in FIGURE 6.

Referring now to the drawing wherein like reference numerals are used throughout the various views to designate like parts, and more particularly to FIGURES 1 and 2, reference numeral 1 generally designates therein a passenger motor vehicle of any suitable construction which is provided with a main frame of appropriate construction and consisting essentially of two longitudinal bearer members 2 extending along the sides of the vehicle which may be reinforced in any suitable conventional manner, such as by lateral cross-bearer members 2'.

According to FIGURE 1, arcuately-shaped structural parts 3 followed by extensions 3a thereof adjoin the main frame members 2. The arcuately-shaped parts 3 and extensions 3a thereof extend above and beyond the wheels 4 in the longitudinal direction of the vehicle 1. As may be readily seen from FIGURE 2, the arcuately-shaped parts 3 and 3a form a bend in the direction toward the longitudinal center plane of the vehicle so that an angular configuration of these structural parts 3, 3a results therefrom.

The structural parts 5 adjoin the structural parts 3a and simultaneously constitute the supports for the radiator grill or the end wall 6 as schematically shown in FIG. 1, for example. Four box-shaped compression members 7 are arranged along the periphery of the radiator grill or end wall 6 which, in turn, support thereon a bulge-like rim member 8. The various parts 3, 3a, 5, 6, 7 and 8 are suitably secured to each other in any conventional manner. For example, the structural parts 3, 3a and 5 may be of hollow construction and may be bolted or welded to each other and to the longitudinal bearer members 2. The radiator grill or terminal wall member 6 may be secured to parts 5 by means of bolts (not shown), while compressible members 7 may be secured to both parts 6 and 8 in any conventional appropriate manner depending on the type and material used therefor.

The various parts 3, 3a, 5, 6, 7 and 8, as set forth hereinabove, extend from the end of the vehicle to the longitudinal bearer members 2, and are so constructed as to possess an ever-increasing impact resistance or rigidity in order that an ever-increasing resistance is opposed to an impact force as schematically illustrated by arrow 9. The various impact resistances may be obtained by varying the materials used, the configuration of the parts, for instance, by utilizing a taper or a pre-existing bin, or by reason of differing cross-sectional profiles. Rim member 8, is therefore, plastically deformable by force 9 and resists the force 9 with a counter force less than the force required to compress elements 7. The compressive force resisted by elements 7 is, in turn, smaller than the resistive force offered by grill or end wall 6 and its supporting elements. For example, the bolts securing wall member 6 to parts 5 may be breakable bolts resisting a force at least equal to the force necessary to compress members 7. Parts 5 in turn are placed in the sequence whereby the resistance of an impact force 9 increases in the direction toward the longitudinal bearer members 2. The thickness of the material used or the cross-sectional configuration of elements 5, 3a and 3 are arranged so that these elements offer an increasing resistance to impact forces.

Accordingly, FIGURE 1 illustrates an arrangement whereby the impact force 9 which occurs at the height H corresponding to the internationally regulated height of a conventional bumper, which acts on the bulge-like rim member 8, has interposed thereagainst at least five deformable parts between the force and a vertical transverse plane extending through the axes of the wheels 4, namely, the bulge-shaped rim member 8, compressing members 7, grill or end wall member 6, supporting parts 5 and the continuation or extension 3a of the arcuately-shaped structural parts 3. These five parts must be first deformed by the impact force 9 before the interior space 10 of the motor vehicle 1 or the longitudinal bearer members of the main frame 2 suffer any damage or deformation. The internationally regulated height of the conventional bumper refers to the standard height of such bumper as used internationally, approximately 450 to 500 mm.

FIGURES 3 through 5 illustrate modified embodiments of the present invention in which the arcuately-shaped structural parts 3 partially surround wheels 4 and extend directly with the rectilinear extensions 3a thereof up to the transversely extending vehicle plane adjacent the front or rear end of the vehicle and defined by apertures 1' formed at the ends of the body 1, or, in other words, up to the plane of the radiated grill or end wall 6.

The vehicle ends are effectively formed by an impact-protecting device in the form of a frame-like structure. Each rectilinear extension 3a of a corresponding arcuately-shaper part 3 is connected at the place of connection 11 with a bracket-like support member 12. The bulge-shaped rim member 8 is arranged at the vehicle on two such support members 12 by the interposition of a suitable member, for instance, of four box-shaped compression members 7. The grill or end wall 6 of the vehicle extends over the apertures 1' between members 8 and 12. The rim member 8, compressive members 7 and the grill or end wall 6 are constructed and arranged in a manner similar to that described in FIGURES 1 and 2 so as to exhibit an increasing resistance to impact forces in the direction of arrow 9 as described hereinabove due to their configuration, composition and size.

According to the embodiment of FIGURE 4, the bulge-shaped rim member 8 is additionally provided with an elastic cover 13 having a resistance to impact force 9 less than that of member 8, whereas in the embodiment of FIGURE 5, horn-like members 14' may be similarly provided on the bulge-shaped rim member 8. The force 9 exerted against horn-like members 14' exerts a moment corresponding to the lever arm $h_3$ which provides a resistance to the impact force less than the resistance offered by the rim member 8. This relationship between the resistance offered by members 14' and member 8 is in line with the present invention which provides an arrangement wherein an increasing resistance to impact forces in the direction of the force as illustrated by arrow 9.

By reason of the arrangement of the structural and connecting parts according to FIGURES 3 to 5, a multi-lever action is attained upon the occurrence of an impact force.

A force occurring in the position and in the direction of the arrow 9 (FIGURE 3) would exert a moment corresponding to the lever arm $h_1$ at the center of the connecting place 11. A further moment with a lever arm $h_2$ would become effective at the point 14 of the connecting place between extension 3a of the arcuately-shaped part and the arcuately-shaped structural part 3 itself. After deformation of the compression and bending members inserted ahead, a breakage, therefore, occurs, in case of collision, at first at place 11 under the lever action $h_1$, and thereupon in continuation of the impact the extension 3a of the arcuately-shaped part 3 will be subjected to bending forces under the lever action $h_2$, especially if the part 3, 3a is provided with a pre-existing angularly-bent configuration in the direction of the vehicle longitudinal center plane as shown in FIGURE 2. Again, as in FIGURES 1 and 2, the various parts 8, 7, 6, lever arm $h_1$ and lever arm $h_2$ exhibit an increasing resistance to impact deformation in the direction of the longitudinal bearer members.

According to the embodiment of FIGURE 5, an additional lever action $h_3$ may be effectively inserted ahead of lever arms $h_1$ and $h_2$ by the provision of the horn-like members 14.

The structural parts 3 surrounding the wheels in an arcuate manner and the extension 3a thereof, according to the embodiment of FIGURES 6, 7 and 8, are made of sheet-metal members which form the extensions of the outer longitudinal side bearer members 2. The sheet metal members 3, 3a are provided with tapered sections 15 and 16 (FIGURE 6) having a reduced dimension which may essentially coincide with the angular bends 15' and 16' (FIGURE 7). However, the sheet-metal members 3 and the extensions 3a thereof may also be constructed without pre-existing bends (FIGURE 8). By the use of the sections 15 of reduced dimension, together with the arcuately-shaped structural parts 3 and the extensions 3a thereof in the front part of the vehicle, it is possible to achieve bending or breakage at the place 15 or 15' in case of collision. In that manner, the vehicle is safeguarded against more far-reaching damages. The inventive principle of increasing rigidity against impacts as regards the structural and connecting parts is maintained again in the sequence of the structural parts, 8, 7, 6 and is continued at the point 15 or 15' within structural part 3 up to the main frame 2. However, interposed therebetween is the front part 3a of the structural part 3, the resistance to impact of which is greater than that at point 15 or 15'. By the use of this particular construction in accordance with the main inventive concept, the elements, for instance, the headlights disposed within the bulge-shaped rim member 8 are protected in a far-reaching manner.

With a frame construction within the rear region of the vehicle, as shown in the embodiments of FIGURES 6, 7 and 8 of the present invention, the extension 16 of the structural part 3 is tapered in the direction toward the vehicle rear end to provide the sections with reduced dimension so that an additional place susceptible to breakage is produced in the rear part of the vehicle.

Front and rear skirt portions 17 and 18, as shown in FIGURES 6 and 8, may be connected to the sheet-metal members forming the arcuately-shaped parts 3 which cover or delimit the engine and luggage space respectively as fire walls. The configuration and dimensioning of these skirt portions 17 and 18 may also be used for the very purposes of the present invention since they are suited in a similar manner to absorb the impacts coming from the front or rear thereof.

The sundry embodiments of the frame may be used in a similar manner for the rear as well as the front construction of a motor vehicle.

While I have shown and described several embodiments in accordance with the present invention, it is understood that the same is not limited thereto but is susceptible of many changes and modifications within the spirit and scope of the present invention, and I, therefore, do not wish to be limited to the details illustrated and described herein, but intended to cover all changes and modifications as are encompassed by the scope of the appended claims.

I claim:

1. In a frame construction for the front or rear region of a motor vehicle including a body provided with an aperture in an essentially transverse plane of the vehicle at least at one end thereof, a plurality of front and rear vehicle wheels, and a main frame means including longitudinal bearer means extending approximately in the plane of the front and rear wheels of the respective vehicle sides and cross bearer means interconnecting said longitudinal bearer means, the improvement consisting essentially of means for effectively extending said longitudinal bearer means to a respective vehicle end and for exhibiting a decreasing resistance against impacts in the direction from said longitudinal bearer means toward said vehicle end, said means comprising a plurality of structural and connecting parts, and means effectively interconnecting successive ones of said parts with one another and with said longitudinal bearer means, said plurality of parts individually exhibiting a decreasing resistance against impacts in the direction from said longitudinal bearer means toward said vehicle end, said structural and connecting parts including at least at one end of the vehicle arcuately shaped first elements connected to respective longitudinal bearer means and extending longitudinally of the vehicle and surrounding at least in part respective vehicle wheels, an extension for each of said first elements operatively secured thereto, a second element covering at least in part said aperture in said body, further connecting means including said extensions operatively connecting each of said first elements with said second element, a bulge-shaped rim member for said second element, said rim member forming the end of said vehicle, and a plurality of compressible means for securing said bulge-shaped rim member on said second element.

2. A frame construction according to claim 1, wherein said second element is a radiator grill.

3. A frame construction according to claim 1, wherein said second element is effectively interconnected with said further connecting means at a height different from the internationally normal height of the conventional bumper.

4. A frame construction according to claim 1, wherein said further connecting means includes bracket-like support members secured to said extensions, and wherein said compressible means secure said bulge-like rim member on said bracket-like support members.

5. A frame construction according to claim 1, further comprising an additional bulge-like member mounted on and extending from said bulge-like rim member in the direction toward said vehicle end, said additional bulge-like member being made of elastically deformable material.

6. A frame construction according to claim 1, further comprising horn-like bumper guards mounted on the lower part of said bulge-like rim member and extending outwardly therefrom in the direction of said vehicle end with the upper region of said horn-like bumper guards being disposed within the zone of the internationally prescribed height for the conventional bumper.

7. A frame construction according to claim 1, wherein said first elements and said extension are of sheet-metal construction forming continuations of said longitudinal bearer means and are provided within the area disposed approximately vertically above the respective wheel axis with a section which continuously changes toward said vehicle end in one of its dimensions.

8. A frame construction according to claim 4, wherein the centers of the points of connection between said support members and said extensions are disposed at a height different from the height internationally prescribed for the conventional bumper.

9. A frame construction according to claim 7, wherein said one of said dimensions is the height thereof.

10. A frame construction for the front or rear region of a motor vehicle having a plurality of front and rear wheels and a load-carrying space defined between said wheels, comprising main frame means including longitudinal bearer means extending between the front and rear wheels of the respective vehicle sides approximately in the plane of said front and rear wheels and cross bearer means interconnecting said longitudinal bearer means, and impact-protecting means for said space adapted to provide a plurality of planned weak points in said frame construction effectively extending the longitudinal bearer means to a respective vehicle end, said last-mentioned means comprising a plurality of structural parts successively connected with one another and to said longitudinal bearer means, said structural parts being so constructed and arranged that the successive parts exhibit a decreasing resistance against impact outwardly from said longitudinal bearer member toward said vehicle end, and including at least at one end of the vehicle arcuately shaped first elements connected to the respective longitudinal bearer means extending essentially longitudinally of the vehicle and surrounding at least in part the respective wheels, a second element forming the vehicle end wall, a bulge-shaped rim member secured to said second element and extending forwardly of said second element with respect to said vehicle end wall, and connecting means operatively connecting each of said first elements with said second element whereby said plurality of parts effectively form an extension of said main frame and protect said wheels and longitudinal bearer means from damage by impact.

11. A frame construction for the front or rear region of a motor vehicle as defined in claim 10, wherein said first member includes a portion thereof which is angularly bent in the direction toward the central longitudinal plane of the vehicle.

References Cited in the file of this patent

UNITED STATES PATENTS

| | | |
|---|---|---|
| 461,759 | Koch | Oct. 20, 1891 |
| 1,261,552 | Kingsbery | Apr. 2, 1918 |
| 1,347,937 | Clary | July 27, 1920 |
| 1,473,651 | Smith | Nov. 13, 1923 |
| 1,711,765 | Wright | May 7, 1929 |
| 1,967,524 | Allen | June 24, 1934 |
| 2,058,080 | Horowitz | Oct. 20, 1936 |
| 2,065,665 | Dietrich | Dec. 29, 1936 |
| 2,254,497 | Schafer | Sept. 2, 1941 |
| 2,645,519 | Stanfield | July 14, 1953 |
| 2,751,995 | Kastory | June 26, 1956 |
| 2,762,646 | Dollar | Sept. 11, 1956 |
| 2,779,620 | Reed | Jan. 29, 1957 |
| 2,845,144 | Bohn | July 29, 1958 |

FOREIGN PATENTS

| | | |
|---|---|---|
| 695,289 | France | Sept. 29, 1930 |